United States Patent
Crespo et al.

(10) Patent No.: US 6,686,968 B1
(45) Date of Patent: Feb. 3, 2004

(54) EXTENDED CHARACTER DISPLAYING METHOD AND APPARATUS FOR REFRESHING TELETEXT PAGES

(75) Inventors: Monsieur Thierry Crespo, Trets (FR); Monsieur Vincint Tauzia, Aix en Provence (FR)

(73) Assignee: STMicroelectronics SA, Gentilly (FR)

( * ) Notice: Subject to any disclaimer, the term of this patent is extended or adjusted under 35 U.S.C. 154(b) by 530 days.

(21) Appl. No.: 09/686,335

(22) Filed: Oct. 11, 2000

(30) Foreign Application Priority Data

Oct. 29, 1999 (FR) .............................. 99 13587

(51) Int. Cl.$^7$ ................................ H04N 7/08
(52) U.S. Cl. ...................................... 348/468
(58) Field of Search ................ 348/468, 563, 348/564, 569, 473, 474, 476, 477, 478

(56) References Cited

U.S. PATENT DOCUMENTS

| | | | |
|---|---|---|---|
| 4,719,510 A | * 1/1988 | Kinghorn | 348/468 |
| 4,992,871 A | * 2/1991 | Bensch et al. | 348/468 |
| 5,410,359 A | * 4/1995 | Odijk et al. | 348/468 |
| 5,477,274 A | * 12/1995 | Akiyoshi et al. | 348/468 |
| 5,519,443 A | * 5/1996 | Salomon et al. | 348/467 |
| 5,579,055 A | * 11/1996 | Hamilton et al. | 725/49 |
| 6,208,383 B1 | * 3/2001 | Park | 348/468 |

FOREIGN PATENT DOCUMENTS

| | | | |
|---|---|---|---|
| EP | 0362940 | 4/1990 | H04N/7/087 |
| GB | 2268864 | 1/1994 | |

* cited by examiner

*Primary Examiner*—Michael H. Lee
(74) *Attorney, Agent, or Firm*—Allen, Dyer, Doppelt Milbrath & Gilchrist, P.A.; Lisa K. Jorgenson

(57) ABSTRACT

A method for displaying extended characters for refreshing a page of teletext that includes, successively for each of the e tended characters to be displayed in a determined line of the teletext page, erasing the old extended characters in the line between the display position of the n w extended character to be displayed and a determined position further back. A character in the determined position further back is not erased. The determined position further back is the display position of a new extended character preceding in the determined line the extended character to be displayed or the display position of the first character of the line. The method further includes displaying the extended character to be displayed at its display position. The method prevents flickering of extended characters caused by the refresh of the teletext page.

20 Claims, 2 Drawing Sheets

FIG. 1a
(PRIOR ART)   TOTO&Cie : toto@titi.com

FIG. 1b
(PRIOR ART)   TOTO_Cie : toto_titi.com

FIG. 1c
(PRIOR ART)   TOTO&Cie : toto_titi.com

FIG. 1d
(PRIOR ART)   TOTO&Cie : toto@titi.com

FIG. 2a   TOTO&Cie : toto@titi.com

FIG. 2b   TOTO&Cie : toto@titi.com

FIG. 2c   TOTO&Cie : toto@titi.com

FIG. 2d   TOTO&Cie : toto@titi.com

FIG. 2e   TOTO&Cie : toto@titi.com

EXTENDED CHARACTER DISPLAYING METHOD AND APPARATUS FOR REFRESHING TELETEXT PAGES

FIELD OF THE INVENTION

The present invention relates to teletext, and, more particularly, to a method and apparatus for displaying extended characters for refreshing teletext pages.

BACKGROUND OF THE INVENTION

Teletext is defined, for example, in European Television Standard 300,706 dated May 1997, which is incorporated herein by reference in its entirety. Teletext is an auxiliary service provided by television channels for transmitting written information (text) in addition to video (images) and audio (sound) information.

The written information is encoded in digital form, and is transmitted in data packets at video frequencies at time intervals corresponding to frame synchronizations. A packet of teletext data, or a teletext packet, is thus sent every 20 milliseconds. The teletext packet is received and decoded by a teletext decoder incorporated within, or is connected to a television receiver. In other words, a teletext packet occupies the frequency band allocated to the television signal during a period corresponding to the period over which a scan line is transmitted.

A television screen can display a page of teletext having 25 lines and 40 columns, i.e., 25×40=1,000 displayed characters. Nevertheless, a page of teletext is described by more than 25 teletext packets. For a complete definition of a page of teletext, a much greater number of packets can be transmitted. Different type teletext packets are distinguished by a number ranging from 0 to 31. This is referred to as the Y number in the terminology referenced teletext standard.

There is thus transmitted a packet of a first type, referred to as a header packet, for which Y is 0, and which contains, in particular, information pertaining to the page number. Then, twenty five packets at most of a second type are transmitted, referred to as normal packets or display packets. Y is equal to 1 to 25, respectively, which the packets respectively contain level 1 (normal) characters for direct display on the television screen. Finally, depending on circumstances, packets of a third type referred to as non-displayable packets are transmitted. Y is equal to 26, 27, 28, 29, 30 or 31. The packets contain, among other, display enhancement data.

The non-displayable packets for which Y is equal to 26 are also referred to as X/26 packets. They contain, in particular, extended characters which are superimposed with the normal displayed characters. Extended characters are special characters, and include characters such as @, µ, #, &, $, £, . . . They are also called X/26 characters.

All of the teletext packets required to define all the teletext pages of the service are transmitted successively in cycles. The pages of a teletext service can be associated, if needed, to form logical sets called magazines. When the teletext service is called in, the teletext decoder automatically seeks page 100. Page 100 is a contents page in which are presented the different available magazines as well as the number of the first page of each of those magazines.

The contents page is loaded into a display memory of the teletext decoder. The contents page is read continually by the television's display to display its contents on the screen. In other words, the screen page is at each moment the image of the teletext page stored in the display memory. When the user selects another teletext page, the contents page is loaded into the display memory and is subsequently displayed on the screen.

When a page of teletext is displayed on the screen, the data received during subsequent cycles in teletext packets which corresponds to that page are loaded into the display memory, either directly or indirectly. Two different modes for displaying teletext pages are known.

According to a first mode, the teletext pages are loaded into a buffer memory in step with the reception of teletext packets transmitted during a complete cycle. In order to display a given teletext page, the corresponding data are loaded from the buffer memory into the display memory. In other words, the data of the teletext page to be displayed pass through a buffer memory. This makes it possible to prevent undesirable display effects caused by the fact that not all the characters to be displayed are necessarily received at close enough intervals.

However, a buffer memory having a capacity on the order of 1 Kbyte per page is required to be stored. Such a buffer memory is penalizing with respect to the cost of televisions operating according to this display mode. This is why the second display mode is generally preferred. According to this second mode, the data of the teletext page to be displayed are loaded directly into the display memory in step with reception of teletext packets.

The expression "refreshing the displayed page" is understood to mean replacing the characters of the displayed page with the characters defined by the teletext packets corresponding to that same page and received during a later cycle. The purpose of refreshing is to ensure that the display takes into account a possible change in the contents or in the presentation of that displayed page. It also makes it possible to obtain animation effects for the displayed page.

For both extended characters and normal characters, the order of reception of the characters is by convention. This convention is as follows, which considers the television screen as it appears to the user: from the top line to the bottom line, and within each line from left to right. In what follows, unless otherwise stated, the words first, last, previous, following, or similar are used with reference to this convention.

According to known display methods, the extended characters in the displayed page are erased globally for each line of the page upon reception and decoding of the first extended character to display in that line. As an illustration, consider the example of a text initially displayed on a given line as shown in FIG. 1a. This line gives the address of an imaginary electronic mailbox of an imaginary company called TOTO&Cie. The text for this line includes two extended characters, which are & and @.

The first step in the process of refreshing a line according to the prior art includes erasing the two extended characters & and @ so that the line on the screen appears as shown in FIG. 1b. In this figure, the position of the erased characters is represented symbolically by a dash in the underscore position. However, a space actually appears at these positions on the screen according to the user.

At a second stage, the character & is displayed further to receiving and decoding the teletext packet in which it is encoded and transmitted. The line then appears to the user as shown in FIG. 1c. At a third stage, the character @ is displayed further to receiving and decoding the teletext packet in which it is encoded and transmitted. The line then appears to the user as shown in FIG. 1d.

A problem arises from the fact that the X/26 packets in which the characters & and @ are encoded and transmitted are not necessarily the same packet, nor even two consecutive X/26 packets. As a consequence, the time interval between the first stage and the second stage, and/or between the first stage and the third stage, can exceed the retinal remanence of the eye. Retinal remanence is the property of the human eye not to perceive variations in an image which occur at a frequency exceeding a certain threshold. The resulting visual effect to the user is that of a flicker. This display effect is undesirable to the user.

Such a problem only arises when refreshing a previously displayed teletext page. When the user selects a new teletext page, the display memory is erased and the data of the new teletext page to be displayed are loaded in step with the reception of corresponding teletext packets. Accordingly, there occurs no undesirable display effect. This also applies when displaying the first teletext page (contents page) upon entering the teletext service. As mentioned above, such a problem does not arise with teletext devices having a buffer memory.

SUMMARY OF THE INVENTION

An object of the present invention is to solve a problem specific to the use of teletext decoders operating according to the above described second display mode. This problem arises upon refreshing the displayed page, and is inherent to known methods of displaying extended characters for refreshing a teletext page, as implemented in an apparatus that does not have a buffer memory.

This and other objects, features and advantages in accordance with the present invention are provided by a method for displaying extended characters for refreshing a teletext page, which comprises successively for each of the extended characters to be displayed in a determined line of the teletext page the following steps:

a) erasing the old extended characters present in the line between the display position of the new extended character to be displayed and a determined position further back, the latter not included. The determined position further back is the display position of the new extended character preceding, in the determined line, the extended character to be displayed or, failing that, the display position of the first character of the line; and b) displaying the extended character to be displayed at its display position.

In this way, when refreshing a teletext page, the extended characters are only erased which, as the case arises, must disappear. In this way, no flickering effect is observable by the user.

BRIEF DESCRIPTION OF THE DRAWINGS

Other characteristics and advantages of the invention shall become apparent from reading the following description. The description is illustrative and is to be read with reference to the appended drawings in which:

FIGS. 1a to 1d illustrate a line of a teletext page as it appears on the screen after being refreshed according to the prior art;

FIGS. 2a to 2e illustrate the same line from FIGS. 1a to 1d as it appears on the screen after being refreshed according to a method of the present invention;

DETAILED DESCRIPTION OF THE PREFERRED EMBODIMENTS

Displaying a character at its active position, denoted as r/c in the referenced teletext standard, is understood to mean writing in the display memory of the teletext apparatus at the address corresponding to this position. The code corresponding to that character is encoded on seven data bits D0–D6 in a given character set.

Likewise, erasing a character is understood to mean writing at the address of the display memory corresponding to the active position of that character of the code corresponding to a space or blank. The active address r/c includes a first component r and a second component c which are respectively the line number and the column number of the teletext screen to which the character belongs. The symbol r varies between 1 and 25 while c varies between 1 and 40.

Figure 3:
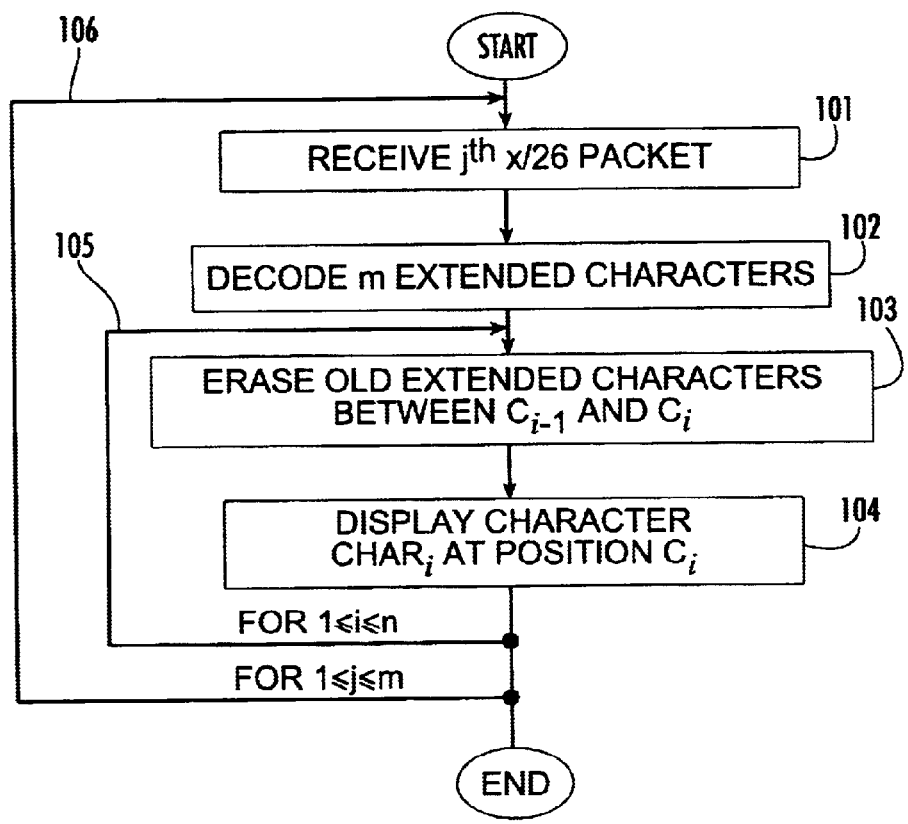
FIG. 3 is a flow chart of the method according to the present invention.

The method and apparatus of the present invention are respectively described with reference to the flow chart of FIG. 3 and the apparatus diagram of FIG. 4.

A teletext packet comprises 360 bits organized in 45 bytes (octets) numbered 1 to 45. In each octet, the bits are numbered 1 to 8, respectively starting from the least significant bit (LSB) to the most significant bit (MSB). The bits are normally transmitted starting from bit 1.

The nondisplayable packets, or X/26 packets, have a specific format described in paragraph 9.4 and FIG. 11 on page 29 of the referenced teletext standard. According to this format, a packet comprises thirteen octet triplets for transmitting the display enhancement information. Each triplet defines an X/26 character. Only eighteen of the twenty four bits of the triplet are effective bits.

With respect to the effective bits, six bits encode the column number of the teletext screen to which belongs the character to be displayed, i.e., the display position of the character in the current line. Five bits are mode bits defining the display mode (enhanced or other), or else a command to change the current line. Such a change is obtained by incrementing a line counter of the apparatus. Seven bits are data D0–D6 encoding the character to be displayed in a given character set.

The steps according to the present invention are preceded by two steps 101 and 102 (FIG. 3) which are not essential for solving the technical problem of flickering when refreshing a teletext page. These steps 101 and 102 respectively include receiving and decoding an X/26 packet to determine therefrom at least one extended character to display in at least one line of the teletext screen, as well as its active position. This active position is more particularly defined on the current value of the line counter of the apparatus and on the display position of the character in the current line.

Ci denotes the display position in the current line of the $i^{th}$ extended character to display in that line. Likewise, CHARi denotes the character code defined by the bits D0–D6. Index i is greater than or equal to 1, and i varies between 1 and n. In a simple example corresponding to FIG. 3, n is the number of extended characters decoded in the $j^{th}$ X/26 packet received at step 101. Index j varies between 1 and m, where m is the number of X/26 packets required for defining a teletext page.

In the example described with reference to the figures, m is equal to unity and n is equal to 2. In other words, C1 denotes the display position in the current line of the first extended character & to be displayed in that line. Likewise, C2 denotes the display position of the second extended character @ to be displayed in the current line. The code for that character is denoted CHAR2. Also, C0 denotes the position of the first character of the current line.

After step 102, the method according to the present invention comprises two steps 103 and 104 for each of the extended characters CHARi to be displayed in the current line of the teletext page. Step 103 comprises erasing the old extended characters present in that current line between the display position Ci of the new extended character CHARi to be displayed and a determined position further back, with the latter not included. The determined position further back is the display position Ci−1 of a new extended character CHARi−1 preceding in the line the extended character to be displayed CHARi or, failing that, the position C0 of the first character of the current line. This position is identified by the value stored in an adapted register of the apparatus. At an initial state, this register stores the value of the display position C0 of the first character of the line.

Step 104 comprises displaying the extended character to be displayed CHARi at its display position Ci in the current line. The character that may be present at that position is simply removed. In the case of a refresh without modification in the line, this is the same character. However, in the case of a refresh with modification of the line, this can be another character, and possibly even a normal character.

The current line is the one defined by the value of the apparatus' line counter. This counter is incremented after decoding a triplet of the received X/26 packet, in which the mode bits encode a predetermined command provided to this effect. At that time too, the value C0 is written into the above mentioned register of the apparatus.

Steps 103 and 104 are repeated for each extended character decoded at step 102, that is, for i ranging from 1 to n. This is symbolized by loop 105 in FIG. 3.

As mentioned above, the extended characters to be displayed in a given line of the screen can be transmitted in more than one X/26 packet, notably when there are more than thirteen of them. In this case, m is greater than unity. Consequently, steps 101 to 104 can also be repeated for displaying all the extended characters of a given line and, as the case arises, for displaying extended characters of all lines of the teletext page that comprise such characters. In other words, steps 101 to 104 are repeated for j ranging from 1 to m. This is symbolized by loop 106 in FIG. 3.

It is important to note that the method is implemented line by line, and as and when the X/26 packets are received. In addition, the time lapsed between step 103 and step 104 is always less than the time for processing a teletext packet, i.e., 20 milliseconds. In other words, the duration over which an extended character disappears before being displayed again is less than 20 milliseconds. This duration is sufficiently low for retinal persistence to prevent any flickering effect observable by the user.

To illustrate this advantage of the process according to the present invention, FIGS. 2a to 2e show the line of characters of FIG. 1a as displayed on the screen during a refresh without modification in accordance with the invention. FIG. 2a shows the line as it appears initially. FIG. 2b shows the same line as it appears after the first iteration of step 103, namely the one relative to the first extended character & and for which i is 1. FIG. 2c shows that line after the first iteration of step 104. FIG. 2d shows that line after the second iteration of step 103, namely the one relative to the second extended character @, and for which i is 2. FIG. 2e shows that line after the second iteration of step 104.

In this example no extended character is erased since only a refresh without modification of the line is concerned. In the case of refresh with a modification of the line (not shown), an extended character that would have been present, for example, between the first character of the line and the character & (which would then have been visible in FIG. 2a) and which should no longer be visible after refreshing, would have disappeared at FIG. 2b to no longer reappear.

In a variation of the method, the extended character present at the display position Ci of the extended character to display CHARi is also erased. According to this variation, the character & and the character @ disappear respectively at FIG. 2b and FIG. 2d. The other FIGS. 2a, 2c, and 2e remain identical. This variation does not introduce a flickering effect visible to the user.

The character initially present at position Ci is, as the case arises, replaced by the extended character to display CHARi as it has been received and decoded. The display of the latter in accordance with step 104 is achieved at the latest in the 20 milliseconds that follow. Therefore, there is no flickering effect visible by user. This variation can be advantageous in certain particular cases.

Figure 4:
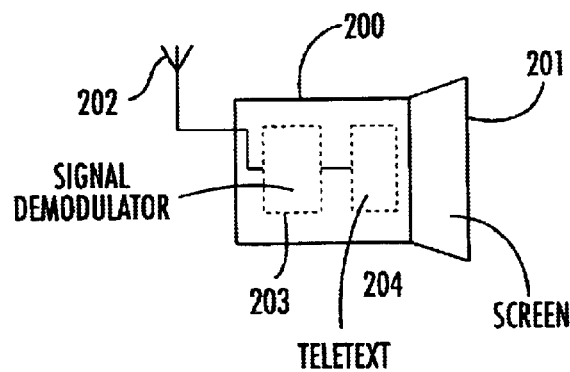
FIG. 4 is an apparatus implementing the method according to the present invention.

FIG. 4 is a diagram of an apparatus for implementing the above-described method. Such an apparatus, e.g., comprises a television set 200 with a screen 201, and a receiving antenna 202 coupled to a teletext decoder 204 via a television signal demodulator 203. The decoder comprises a display memory (not shown) which, as already mentioned, is read continuously by the screen display.

The decoder can be, for instance, a decoder of the ST92195 family marketed by STMicroelectronics SA, which is the assignee of the present invention. Such a decoder notably comprises a data acquisition cell and a software driven data processing cell. The method according to the present invention is then advantageously implemented by the software of the decoder in the form of a computer program having the effect of refreshing the displayed teletext page without a flickering effect visible to the user. The process according to the present invention can also be implemented by a teletext decoder comprising circuits designed for that purpose, such as logic gates, logic circuits, etc.

That which is claimed is:

1. A method for displaying extended characters for refreshing a teletext page, the method comprising:
   erasing old extended characters in a line of the teletext page between a display position of a new extended character to be displayed and a determined position further back with a character in the determined position further back not being erased, the determined position further back being a display position of a new extended character preceding in the line of the extended character to be displayed or a display position of a first character of the line; and
   displaying the extended character to be displayed at its display position;
   the erasing and displaying being performed successively for each of the extended characters to be displayed in the line of the teletext page.

2. A method according to claim 1, wherein erasing further comprises erasing an extended character at the display position of the extended character to be displayed.

3. A method according to claim 1, wherein the erasing and displaying of the extended characters in the line of the teletext page are performed in accordance with a teletext standard.

4. A method according to claim 1, wherein the erasing and displaying are implemented via software in a teletext decoder.

5. A method according to claim 1, wherein the erasing and displaying are implemented via logic circuits in a teletext decoder.

6. A method for displaying extended characters for refreshing a teletext page, the method comprising:

erasing old extended characters in a line of the teletext page between a display position of a new extended character to be displayed and a determined position further back, the determined position further back being a display position of a new extended character preceding in the line of the extended character to be displayed or a display position of a first character of the line; and displaying the extended character to be displayed at its display position.

7. A method according to claim 6, wherein the erasing and displaying are performed successively for each of the extended characters to be displayed in the line of the teletext page.

8. A method according to claim 6, wherein erasing old extended characters in the line of the teletext page between the display position of the new extended character to be displayed and the determined position further back is performed without erasing a character in the determined position further back.

9. A method according to claim 6, wherein erasing further comprises erasing an extended character at the display position of the extended character to be displayed.

10. A method according to claim 6, wherein the erasing and displaying of the extended characters in the line of the teletext page are performed in accordance with a teletext standard.

11. A method according to claim 6, wherein the erasing and displaying are implemented via software in a teletext decoder.

12. A method according to claim 6, wherein the erasing and displaying are implemented via logic circuits in a teletext decoder.

13. A televison comprising:

a signal demodulator providing at least one teletext package;

a teletext decoder connected to said signal demodulator for decoding the at least one teletext packet for displaying extended characters for refreshing a teletext page, said teletext decoder erasing old extended characters in a line of the teletext page between a display position of a new extended character to be displayed and a determined position further back, the determined position further back being a display position of a new extended character preceding in the line of the extended character to be displayed or a display position of a first character of the line; and a screen connected to said teletext decoder for displaying the extended character to be displayed at its display position in the teletext page.

14. A televison according to claim 13, wherein said teletext decoder and said screen successively perform the erasing and displaying for each of the extended characters to be displayed in the line of the teletext page.

15. A television according to claim 13, wherein said teletext decoder erases old extended characters in the line of the teletext page between the display position of the new extended character to be displayed and the determined position further back without erasing a character in the determined position further back.

16. A televison according to claim 13, further comprising an antenna connected to said signal demodulator for receiving the at least one teletext packet.

17. A televison according to claim 13, wherein said teletext decoder further erases the extended character present at the display position of the extended character to be displayed.

18. A televison according to claim 13, wherein said teletext decoder decodes the at least one teletext packet in accordance with a teletext standard.

19. A televison according to claim 13, wherein said teletext decoder comprises software for decoding the at least one teletext packet.

20. A televison according to claim 13, wherein said teletext decoder comprises at least one logic circuit for decoding the at least one teletext packet.

* * * * *

UNITED STATES PATENT AND TRADEMARK OFFICE
CERTIFICATE OF CORRECTION

PATENT NO. : 6,686,968 B1
DATED : February 3, 2004
INVENTOR(S) : Monsieur Thierry Crespo and Monsieur Vinvent Tauzia It is certified that error appears in the above-identified patent and that said Letters Patent is hereby corrected as shown below:

<u>Title page</u>
Item [57], ABSTRACT,
Line 3, delete "e tended" insert -- extended --
Line 5, delete "n w" insert -- new --

Signed and Sealed this

Twenty-ninth Day of June, 2004

JON W. DUDAS
*Acting Director of the United States Patent and Trademark Office*